(12) United States Patent
Krausz et al.

(10) Patent No.: US 8,408,606 B2
(45) Date of Patent: Apr. 2, 2013

(54) PIPE CLAMP ASSEMBLY WITH TIGHTENING ELEMENT KEEPER

(75) Inventors: Eliezer Krausz, Tel Aviv (IL); Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 0 days.

(21) Appl. No.: 13/225,604

(22) Filed: Sep. 6, 2011

(65) Prior Publication Data
US 2012/0146328 A1   Jun. 14, 2012

(51) Int. Cl.
*F16L 21/00* (2006.01)
(52) U.S. Cl. .................... 285/373; 285/419; 285/420
(58) Field of Classification Search .................. 285/419, 285/420, 421, 367, 92, 373
See application file for complete search history.

(56) References Cited

U.S. PATENT DOCUMENTS

| | | | | |
|---|---|---|---|---|
| 2,846,243 | A * | 8/1958 | Jewell | 285/420 |
| 2,895,197 | A * | 7/1959 | Agne et al. | 285/367 |
| 2,998,629 | A * | 9/1961 | Smith | 285/419 |
| 3,089,212 | A * | 5/1963 | Graham et al. | 285/420 |
| 3,181,901 | A * | 5/1965 | Watts | 285/367 |
| 3,204,665 | A * | 9/1965 | Faint | 285/420 |
| 3,472,537 | A * | 10/1969 | Paterson et al. | 285/420 |
| 3,848,638 | A * | 11/1974 | Huslander et al. | 138/99 |
| 5,271,648 | A * | 12/1993 | Krausz | 285/419 |
| 7,232,160 | B2 * | 6/2007 | Krausz et al. | 285/419 |
| 7,396,053 | B2 * | 7/2008 | Webb et al. | 285/420 |

* cited by examiner

*Primary Examiner* — David E Bochna
(74) *Attorney, Agent, or Firm* — Dekel Patent Ltd.; David Klein

(57) ABSTRACT

A pipe clamp assembly including a band having an inner annular seal element wrappable around a pipe, opposing clamp members extending from the band, tightening elements for clamping together the clamp members, the tightening elements passing through holders located at ends of the clamp members, and a keeper fastened to one of the holders at a first end of at least one of the tightening elements, the keeper having a cover portion that lies over the first end.

4 Claims, 1 Drawing Sheet

PIPE CLAMP ASSEMBLY WITH TIGHTENING ELEMENT KEEPER

FIELD OF THE INVENTION

The present invention relates generally to pipe clamp assemblies, such as those used to sealingly connect pipes together or to repair breaks or leaks in pipes.

BACKGROUND OF THE INVENTION

Many kinds of removable band-type couplings for pipes exist in the art. It is noted that throughout the specification and claims, the term "pipe" encompasses any kind of generally cylindrical object, and the terms "clamp" and "coupling" are used interchangeably.

For example, one well known type of pipe coupling includes a seal clamp housing. Clamp members are positioned face to face and a tightening element is tightened to press an annular seal element against the outside of the pipe inserted through the seal clamp housing. One end of the tightening element is generally installed in one of the clamp members and the other end must be brought into a socket or opening formed in the other clamp member.

The tightening elements are generally bolts cooperating with a nut, which are tightened by a torque wrench and the like. The bolts fit into holes or other kinds of openings before tightening. Often when tightening one of the bolts, other bolts which have not yet been tightened, can become loosened in their holes and even fall out of them. This prolongs the tightening procedure and can make it so cumbersome as to require another person to hold the other bolts in place while tightening one of the bolts.

SUMMARY OF THE INVENTION

The present invention seeks to provide novel pipe clamp assembly with a keeper for the tightening elements, as is described more in detail further below. The keeper prevents the tightening elements from falling out of their mounting openings and makes the tightening operation much quicker and easier.

There is provided in accordance with an embodiment of the present invention a pipe clamp assembly including a band having an inner annular seal element wrappable around a pipe, opposing clamp members extending from the band, tightening elements for clamping together the clamp members, the tightening elements passing through holders located at ends of the clamp members, and a keeper fastened to one of the holders at a first end of at least one of the tightening elements, the keeper having a cover portion that lies over the first end.

In accordance with an embodiment of the present invention two opposing legs extend from the cover portion, which straddle the first end. A bent tab may extend from a distal end of each of the legs. The keeper may be assembled to the holder by inserting the legs into apertures formed in the holder.

In accordance with an embodiment of the present invention the cover portion is narrower than the first end.

BRIEF DESCRIPTION OF THE DRAWINGS

The present invention will be understood and appreciated more fully from the following detailed description, taken in conjunction with the drawings in which.

DETAILED DESCRIPTION OF EXEMPLARY EMBODIMENTS

Figures 1A, 1B:
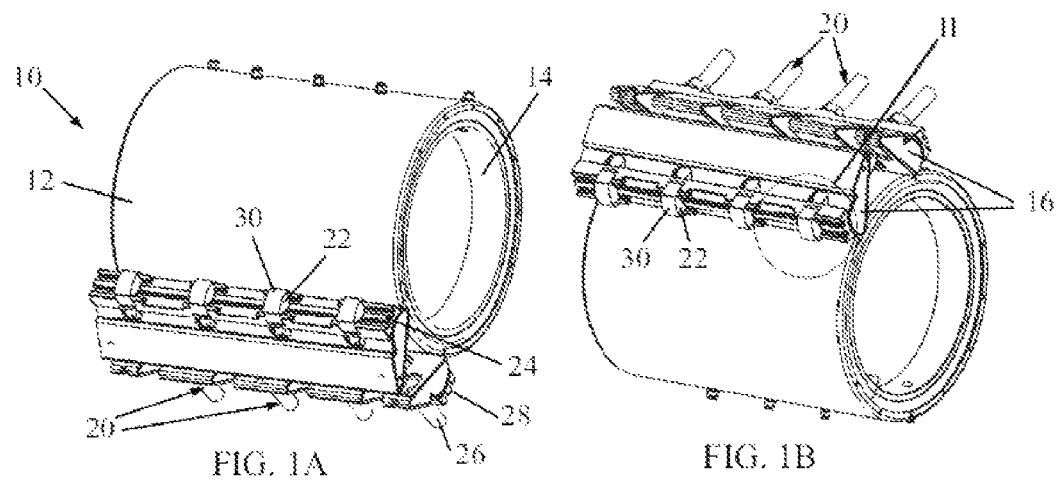
FIGS. 1A and 1B are simplified upper and lower perspective illustrations, respectively, of a pipe clamp assembly, constructed and operative in accordance with a non-limiting embodiment of the present invention.

Reference is now made to FIGS. 1A and 1B, which illustrate a pipe clamp assembly 10, constructed and operative in accordance with a non-limiting embodiment of the present invention.

Pipe clamp assembly 10 includes a band 12 having an inner annular seal element 14 wrappable around a pipe (not shown). Band 12 is typically, but not necessarily, made of metal and annular seal element 14 is typically, but not necessarily, made of an elastomer, such as natural or synthetic rubber.

Opposing clamp members 16 extend from ends of band 12 and are clamped and tightened together with tightening elements 20, such as but not limited to, bolts tightened by nuts. Each of the tightening elements 20 has a first end 22, e.g., the bolt head end, which passes through a hole formed in a holder 24 assembled against one of the clamp members 16. A second end 26 of the tightening element 20, e.g., the nut end, also passes through a hole formed in another holder 28. The holders 24 and 28 serve as nut plates against the clamp members 16.

Figure 2:
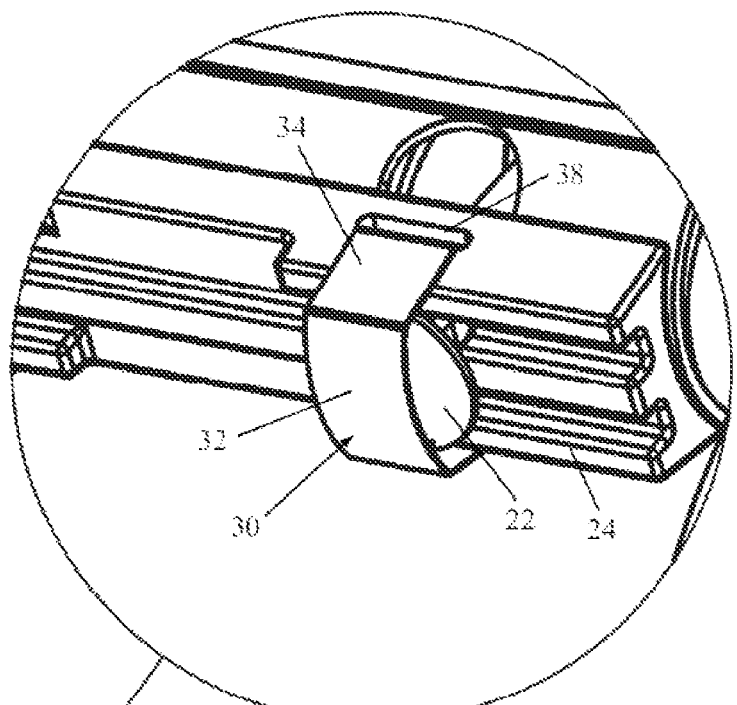
FIG. 2 is an enlarged pictorial illustration of a keeper for tightening elements of the pipe clamp assembly of FIGS. 1A and 1B, constructed and operative in accordance with a non-limiting embodiment of the present invention.
Figure 3:
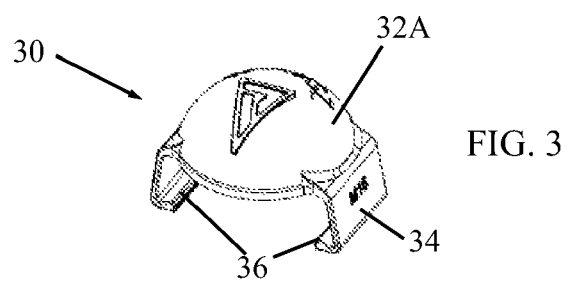
FIG. 3 is an enlarged pictorial illustration of the keeper of FIG. 2.

In accordance with a non-limiting embodiment of the present invention, a keeper 30 is provided at the first end 22 of the tightening elements 20, which prevents the tightening elements 20 from falling out of their mounting openings in holder 24. In one embodiment, as seen in FIGS. 2 and 3, keeper 30 has a cover portion 32, which lies over the first end 22. Two opposing legs 34 extend from cover portion 32 and straddle the first end 22. Bent tabs 36 extend from distal ends of the legs 34. Keeper 30 is assembled to holder 24 by inserting legs 34 into apertures 38 formed in holder 24. Tabs 36 keep the keeper 30 in place in apertures 38. Keeper 30 may be made of metal or plastic or other suitable materials. Cover portion 32 may be of any shape, such as but not limited to, flat in FIG. 2 or round (designated 32A) in FIG. 3.

In the illustrated embodiment, the head of tightening element 20 is a round bolt head. The shank of tightening element 20 may have a non-round (e.g., square) portion which sits in a similarly shaped non-round hole in holder 24, so that tightening element 20 is self-wrenched in the hole. Alternatively, the head of tightening element 20 is hexagonal with flat faces for gripping with a wrench or other suitable tool. Cover portion 32 can be narrower than the first (head) end of tightening element 20 to allow easy access for the tool to grip this end of tightening element 20. It is also noted that the keeper 30 could alternatively be used for the other end of tightening element 20.

The keeper 30 can be provided for one or more or all of the tightening elements 20 that are used in the assembly 10. Keeper 30 can be easily removed from the holder, and also replaced, if desired.

The scope of the present invention includes both combinations and subcombinations of the features described hereinabove as well as modifications and variations thereof which would occur to a person of skill in the art upon reading the foregoing description and which are not in the prior art.

What is claimed is:

1. A pipe clamp assembly comprising:
a band having an inner annular seal element wrappable around a pipe;
opposing clamp members extending from said band;
tightening elements for clamping together said clamp members, said tightening elements passing through holders located at ends of said clamp members; and
a keeper fastened to one of said holders at a first end of at least one of the tightening elements, said keeper having a cover portion that lies over said first end, and wherein two opposing legs extend from said cover portion that straddle said first end.

2. The pipe clamp assembly according to claim 1, wherein a bent tab extends from a distal end of each of said legs.

3. The pipe clamp assembly according to claim 1, wherein said keeper is assembled to said holder by inserting said legs into apertures formed in said holder.

4. A pipe clamp assembly comprising:
a band having an inner annular seal element wrappable around a pipe;
opposing clamp members extending from said band;
tightening elements for clamping together said clamp members, said tightening elements passing through holders located at ends of said clamp members; and
a keeper fastened to one of said holders at a first end of at least one of the tightening elements, said keeper having a cover portion that lies over said first end, wherein said cover portion is narrower than said first end.

* * * * *